United States Patent [19]

Schwab et al.

[11] Patent Number: 5,589,535
[45] Date of Patent: Dec. 31, 1996

[54] AIR-DRYING POLYURETHANE RESINS, THEIR PREPARATION AND USE

[75] Inventors: Michael Schwab, Mainz-Kostheim; Gerd Walz; Gerhard Merten, both of Wiesbaden, all of Germany

[73] Assignee: Hoechst Aktiengesellschaft, Germany

[21] Appl. No.: 454,019

[22] Filed: May 30, 1995

Related U.S. Application Data

[63] Continuation of Ser. No. 839,926, Feb. 21, 1992, abandoned, which is a continuation of Ser. No. 650,912, Feb. 5, 1991, abandoned.

[30] Foreign Application Priority Data

Feb. 15, 1990 [DE] Germany ............................ 40 04 651.6

[51] Int. Cl.$^6$ ................ C08J 3/00; C08K 3/20; C08L 75/00; B32B 27/00
[52] U.S. Cl. ............... 524/591; 428/423.1; 523/415; 524/507; 524/839; 524/840; 528/74.5
[58] Field of Search ....................... 524/591, 839, 524/840, 507; 523/415; 528/74.5; 428/423.1

[56] References Cited

U.S. PATENT DOCUMENTS

| | | |
|---|---|---|
| 3,412,054 | 11/1968 | Milligan et al. .................. 524/591 |
| 3,607,800 | 9/1971 | Sekmakas .......................... 528/73 |
| 4,066,591 | 1/1978 | Scriven et al. .................... 524/840 |
| 4,745,151 | 5/1988 | Noll et al. ....................... 524/591 |

*Primary Examiner*—Paul R. Michl
*Assistant Examiner*—Patrick Niland
*Attorney, Agent, or Firm*—Bierman and Muserlian

[57] ABSTRACT

An aqueous coating composition containing at least one water-dispersible polyurethane resin containing air-drying groups and optionally further binder resins and conventional paint additives, which polyurethane resin contains structural units derived from
(A) polyisocyanates,
(B) polyols containing air-drying groups,
(C) optionally polyols which are free of air-drying groups,
(D) compounds having at least two groups which are reactive with isocyanate groups and at least one group capable of anion formation,
(E) optionally monoalcohls containing air-drying groups,
(F) and/or compounds which differ from (B), (C), (D) and (E) and contain at least one group which is reactive with NCO groups, which has excellent pigment compatibility and the coatings produced therefrom have good corrosion protection and good mechanical properties even in the absence of siccatives.

20 Claims, No Drawings

AIR-DRYING POLYURETHANE RESINS, THEIR PREPARATION AND USE

PRIOR APPLICATIONS

This application is a continuation of U.S. patent application Ser. No. 839,926 filed Feb. 21, 1992 which is a continuation of U.S. patent application Ser. No. 650,912 filed Feb. 5, 1991, both now abandoned.

STATE OF THE ART

For environmental reasons, there is an increasing necessity for using water-based coating systems. However, aqueous binders or binder combinations based on polymers which dry physically have not yet become generally accepted in practice due to the lack in water-resistance of the coatings prepared therefrom and the resulting unsatisfactory corrosion protection.

Furthermore, the attempt has been made to use diacrylate-modified alkyd resins as binders for water-dilutable, air-drying paints (see U.S. Pat. No. 4,133,786 and British Patent No. 1,117,126). Likewise, the use of water-dilutable, urethane-modified alkyd resins is known (see EP-A 17,199 and 18,665 and DE-A 1,745,343 and 2,323,546). However, even when mixed with other resins, both groups of binders have specific disadvantages. Thus, the acrylate-modified alkyd resins have only unsatisfactory corrosion protection due to their reduced reactivity of the unsaturated fatty acids caused by copolymerization. In contrast, urethane-modified alkyd resins cause problems due to poor pigment wetting and/or unsatisfactory siccative compatibility.

OBJECTS OF THE INVENTION

It is an object of the invention to avoid the disadvantages of the prior art and particularly to find a water-dilutable binder or coating system which has the positive properties of the fatty acid modified polyurethane resins such as good corrosion protection and excellent mechanical properties, but does not cause any problems with respect to pigmenting or drying with a siccative.

This and other objects and advantages of the invention will become obvious from the following detailed description.

THE INVENTION

The aqueous coating compositions of the invention containing at least one water-dispersible polyurethane resin containing air-drying groups and optionally further binder resins and paint additives, which polyurethane resin contains structural units derived from
(A) polyisocyanates
(B) polyols containing air-drying groups,
(C) optionally polyols which are free of air-drying groups,
(D) compounds having at least two groups which are reactive with isocyanate groups and at least one group capable of anion formation,
(E) optionally monoalcohols containing air-drying groups, and/or
(F) compounds which differ from (B), (C), (D) and (E) and contain at least one group which is reactive with NCO groups.

Surprisingly, it has now been found that certain water-dilutable polyurethane resins containing air-drying groups have the above-mentioned properties. In particular, mixtures of these resins according to the invention with commercially available water-insoluble, fatty acid modified alkyd resins (which themselves can only be used if containing siccatives) completely dry rapidly even in the absence of siccatives and produce coatings having excellent corrosion protection.

The invention furthermore relates to a process for the preparation of this coating composition and its use, in particular, for primers.

The polyurethane resin used in the invention has generally an average molecular weight $M_n$ (calculated from the stoichiometry of the starting material) of 1,600 to 30,000, preferably 1,600 to 10,000, an acid number of 10 to 80, preferably 25 to 60, and a hydroxyl number of 0 to 50, preferably 0 to 5. The content of unsaturated fatty acids is in most cases between 25 and 50, preferably between 30 and 40% by weight, relative to the polyurethane resin. It is water dispersible even in the absence of an external dispersant at least in the alkaline medium and is often even water-soluble under these conditions in the case of low molecular weights. Generally, the molecular chains of this polyurethane resin predominantly have a linear structure, although in some cases a low degree of branching of, preferably up to 30%, particularly up to 10%, can be present. The gel content is generally less than 5% by weight, preferably less than 1% by weight.

The polyisocyanates, preferably diisocyanates, of (A) are the compounds known in the polyurethane and paint sector such as aliphatic, cycloaliphatic or aromatic diisocyanates. They preferably have the formula Q $(NCO)_2$, in which Q is a hydrocarbon radical of 4 to 40 carbon atoms, preferably 4 to 20 carbon atoms, and is preferably an aliphatic hydrocarbon of 4 to 12 carbon atoms, a cycloaliphatic hydrocarbon of 6 to 15 carbon atoms, an aromatic hydrocarbon of 6 to 15 carbon atoms. Examples of diisocyanates of this type which are preferably used are tetramethylene diisocyanate, hexamethylene diisocyanate, dodecamethylenediisocyanate, 1,4-diisocyanato-cyclohexane, 3-isocyanatomethyl-3,5,5-trimethylcyclohexane isocyanate (isophorone diisocyanate), 4,4'-diisocyanatodicyclohexylmethane, 2,2-(4,4'-diisocyanatodicyclohexyl)-propane, 1,4-diisocyanato-benzene, 2,4- or 2,6-diisocyanatotoluene or mixtures of these compounds. isomers, 4,4'- or 2,4'-diisocyanatodiphenylmethane,2,2-(4, 4'-di-isocyanatodiphenyl)-propane, p-xylylene diisocyante, α, α, α' α'-tetramethyl-m- or p-xylylene diisocyanate and mixture of these compounds.

Apart from these simple polyisocyanates, those containing heteroatoms in the radical linking the isocyanate groups are also suitable and examples of these are polyisocyanates which contain carbodiimide groups, allophanate groups, isocyanurate groups, urethane groups, acrylated urea groups or biuret groups. As for further suitable polyisocyanates, see, for example, DE-A 2,928,552. The polyisocyanate (A) content in the polyurethane resin is usually about 10 to 40% by weight, preferably 10 to 25% by weight, relative to the polyurethane resin.

The polyols containing air-drying groups, preferably diols, of (B) or the monoalcohols of (E) which may be present are preferably reaction products of poly(di)epoxides or monoepoxides with unsaturated fatty acids which introduce the air-drying groups.

Suitable polyepoxides, preferably diepoxides, and suitable monoepoxides are the representatives customary in the coating resin sector. A detailed compilation of suitable epoxy compounds can be found, for example, in the handbook "Epoxidverbindungen und Epoxidharze [Epoxy Compounds and Epoxy Resins"]by A. M. Paquin, Springer Verlag, Berlin 1958,. Chapter IV, and in Lee Neville "Handbook of Epoxy Resins", 1967 Chapter 2. Furthermore, reference is made here to EP-A 272,595 and 286,933. Mixtures of several epoxy compounds can also be used. The epoxy equivalent weight of these epoxy compounds (poly(di)- and monoepoxides) should advantageously be 180 to 2,000, preferably 180 to 500.

Polyglycidyl esters and, preferably polyglycidyl ethers of polyphenols (epoxy resins), particularly those based on bisphenol A, are used as the diepoxides. Preferred representatives with respect to monoepoxides are glycidyl ethers or glycidyl esters of 4 to 24 carbon atoms, preferably the glycidyl ester of Versatic Acid.

The unsaturated fatty acids for the introduction of the air-drying groups generally contain 4 to 30, preferably 15 to 25, carbon atoms and have portions of, preferably at least two double bonds which are isolated or, preferably conjugated. See Wagner/Sarx, Lackkunstharze [Synthetic Coating Resins], 5th edition (1971), p. 105 to 110 and DE-A 1,745, 343. Examples of unsaturated fatty acids of this type are palmitoleic acid, petroselic acid, elaidic acid, erucic acid, arachidonic acid, clupanodonic acid and fatty acids from natural oils such as soya, safflower, sunflower, lupine, corn, rape, sesame, cottonseed, wood, castor, tung, perrila, linseed and tallow oil fatty acid. Furthermore, fatty acids obtained by conjugation or isomerization are useful.

The amount of (B) in the polyurethane resin is 20 to 60, preferably 25 to 40% by weight, and that of (E) 0 to 50, preferably 20 to 40% by weight, each relative to the polyurethane resin.

The polyols of (C) optionally used for synthesizing the polyurethane resins are preferably of low molecular weight and generally have a molecular weight $M_n$ of about 60 to 400, preferably 60 to 200, and hyroxyl numbers of, for example, 200 to 1,500. They can contain aliphatic, alicyclic or aromatic groups and their amount is generally 0 to 10, preferably 0 to 5% by weight, relative to the polyol components (B) to (D). Examples of suitable compmponents are the low-molecular-weight polyols having up to about 20 carbon atoms per molecule, for example ethylene glycol, diethylene glycol, 1,2-propanediol, 1,3-propanediol, 1,4-butanediol, 1,3-butylene glycol, cyclohexanediol, 1,4-cyclohexanedimethanol, 1,6-hexanediol, bisphenol A (2,2-bis(hydroxyphenyl)-propane), hydrogenated bisphenol A (2,2-bis(4-hydroxycyclohexyl)-propane) and mixtures thereof and a suitable triol is trimethylolpropane.

Compounds which are suitable for structural unit (D) are described, for example, in U.S. Pat. No. 3,412,054 and U.S. Pat. No. 3,640,924 and in DE-A 2,624,442 and 2,744,544, herein incorporated by reference. In particular polyols, preferably diols, are suitable which have at least one carboxyl group, generally 1 to 3 carboxyl groups per molecule. Suitable groups capable of anion formation include sulfo groups. Examples of compounds of this type are: dihydroxycarboxylic acids such as α, α-dialkylolalkanoic acid, particularly α, α-dimethylolalkanoic acid such as 2,2-dimethylolacetic acid, 2,2-dimethylolpropionic acid, 2,2-dimethylolbuytric acid, 2,2-dimethylolpentanoic acid and dihydroxysuccinic acid, furthermore polyhydroxy acids such as gluconic acid. Of these, 2,2-dimethylolpropionic acid is particularly preferred. Examples of amino-containing compounds (D) are α, ω-diaminovaleric acid, 2,2-diaminotoluene-5-sulfonic acid and the like. Mixtures of these compounds (D) can also be used. The amount of structural unit (D) in the polyurethane resin is generally 2 to 20, preferably 4 to 10% by weight, relative to the polyurethane resin.

In addition to (E) or instead of (E), the polyurethane resin of the invention can also contain structural units (F) which are different from the structural units (B), (C), (D) and (E) and contain at least one group which is reactive with NCO groups. They include monofunctional compounds which are reactive with NCO groups (i.e. which act as chain terminators) such as monoamines, particularly secondary monoamines, or monoalcohols. Examples are methylamine, ethylamine, propylamine, butylamine, octylamine, laurylamine, stearylamine, isononyloxypropylamine, dimethylamine, diethylamine, dipropylamine, dibutylamine, N-methylaminopropylamine, diethyl(methyl)aminopropylamine, morpholine, piperidine, or suitably substituted derivatives thereof, amidoamines from primary diamines and monocarboxylic acids, monoketimines from primary diamines, primary/tertiary amines, such as N,N-dimethylaminopropylamine and the like.

Other compounds suitable for (F) are those having active hydrogen of varying reactivity towards NCO groups (which usually also act as chain terminators) such as compounds having, apart from a primary amino group, also secondary amino groups, or, apart from an OH group, also COOH groups or, apart from an amino group (primary or secondary) also OH groups, the latter being preferred. Examples of these are primary/secondary amines such as 3-amino-1-methylaminopropane, 3-amino-1-ethylaminopropane, 3-amino-1-cyclohexylaminopropane, 3-amino-1-methylaminobutane; monohydroxycarboxylic acids such as hydroxyacetic acid, lactic acid or malic acid, furthermore alkanolamines such as N-aminoethylethanolamine, ethanolamine, 3-aminopropanol, neopentanolamine and preferably diethanolamine.

Finally, structural units (F) can also be derived from so-called chain-lengthening agents, even though this variation is less preferred. Suitable compounds of this type are compounds which are known for this, are reactive with NCO groups and are, preferably, difunctional, and are not identical with (B)/(C) and in most cases have average molecular weights of up to 400. Examples are water, hydrazine, poly(di)amines such as ethylenediamine, diaminopropane, hexamethylenediamine which can also carry substituents such as OH groups. Polyamines of this type are described, for example in DE-A 3,644,371. The amount of (F) in the polyurethane resin is usually between 0 to 10%, preferably 0 to 5% by weight, relative to the polyurethane resin.

The polyurethane resin of the invention is preferably prepared by first preparing a polyurethane prepolymer from the polyisocyanates of (A), the polyols of (B) and optionally the preferably low-molecular-weight polyols of (C) and the compounds of (D), which prepolymer contains on average at least 1.7, preferably 2 to 2.5, free isocyanate groups per molecule, then reacting this prepolymer with the compounds of (E) and/or (F) in a non-aqueous system, and preferably then neutralizing the completely reacted polyurethane resin, and transferring it into the aqueous system. If desired, the reaction with (F), if it is a chain-lengthening agent, can also be carried out after the transfer into the aqueous system.

A variation of the process of the invention consists in carrying out the reaction as a one-step process, i.e. reacting compounds (A) to (E) and/or (F) all at once.

The poly(di)ols of (B) or monoalcohols of (E) which contain air-drying groups are obtained by reacting the corresponding poly (di) epoxides or monoepoxides with the unsaturated carboxylic acids. This reaction is usually carried out at temperatures of 80° to 120° C. in an inert gas atmosphere, preferably in the absence of solvents.

The polyurethane prepolymer is then prepared by reacting polyols (B) and polyols (D) and optionally (C) with the isocyanates (A) by known methods. In this reaction, the polyisocyanate (A) is used in excess with respect to polyols (B) to (D) resulting in a product having free isocyanate groups. These isocyanate groups are terminal and/or pendant, preferably terminal. Advantageously, the amount of polyisocyanate is such that the equivalent ratio of isocyanate groups to the total number of OH groups in polyols (B) to (D) is 1.05 to 1.4, preferably 1.1 to 1.3. The reaction temperatures are usually between 60° and 95° C., preferably between 60° to 75° C., depending on the reactivity of the isocyanate used.

As a rule, this reaction is carried out in the absence of a catalyst, but preferably in the presence of solvents which are inactive towards isocyanates. In particular, those solvents are suitable which are compatible with water such as the ethers, ketones and esters mentioned below and N-methylpyrrolidone. Advantageously, the amount of the solvent does not exceed 20% by weight and is preferably in the range from 5 to 15% by weight, relative to the sum of polyurethane resin and solvent. The prepolymer or its solution is then reacted with the compound of (E) and/or (F), during which the temperature is advantageously in the same range as during the preparation of the prepolymer until the NCO content in the prepolymer has dropped to virtually zero.

Suitable compounds for neutralizing the resulting product which preferably contains COOH groups are tertiary amines, for example trialkylamines having 1 to 12, preferably 1 to 6, carbon atoms in each alkyl. Examples of these are trimethylamine, triethylamine, methyldiethylamine and tripropylamine. The alkyls can, for example, also carry hydroxyl groups as in the case of dialkylmonoalkanol- alkyldialkanol- and trialkanolamines. Ammonia is particularly preferably used as neutralizing agent and the neutralizing agent is first used in a molar ratio with respect to COOH groups of the prepolymer of about 0.3:1 to 1.3:1, preferably about 0.5:1 to 1:1.

The neutralization which, as a rule, takes place between room temperature and 80° C., preferably 40° to 80° C., can be carried out in any desired manner, for example by adding the water-containing neutralizing agent to the polyurethane resin or visa versa. However, it is also possible first to add the neutralizing agent to the polyurethane resin and only then to add the water.

The polyurethane resin content in the aqueous coating composition is in general 5 to 40% preferably 15 to 30% by weight relative to the entire coating composition.

Apart from the polyurethane resin, the aqueous coating composition can contain as binder up to 60, preferably 10 to 40% by weight, relative to the polyurethane resin, of other oligomeric or polymeric materials which are compatible with the polyurethane resin such as other water-soluble or water-dispersible, air-drying resins or water-insoluble, air-drying resins such as alkyd resins. This can often lead to a further improvement in the coating properties such as hardness, gloss and corrosion protection. In the case of water-insoluble resins, they are preferably incorporated in the polyurethane resin before the neutralization and this can be effected with the aid of solvents which are then again removed by distillation.

The aqueous coating composition of the invention, the pH of which is in most cases in the range of about 6.0 to 10.0, preferably 6.8 to 8.5, can additionally contain the customary paint additives such as pigments and fillers and paint auxiliaries, for example antisettling agents, antifoams and/or wetting agents, flow-improving agents, reactive diluents, plasticizers, siccatives (catalysts), solvent aids, thickeners, and the like. The addition of at least a portion of these additives to the coating composition can be delayed until directly before processing. Selection and dosage of these substances which can be added to the individual components and/or the entire mixture are known to one skilled in the art.

Examples of suitable pigments are iron oxides, lead oxides, lead silicates, titanium dioxide, barium sulfate, zinc oxide, zinc sulfide, phthalocyanine complexes and the like, and suitable fillers are mica, kaoline, chalk, quartz powder, asbestos powder, slate powder, various silicas, silicates and talc, including so-called micro-talc having a maximum particle fineness of 10 µm (cf. EP-A 249,727). These pigments and/or fillers are usually used in amounts of 10 to 70, preferably 30 to 50% by weight, relative to the total solids content of the coating composition.

Suitable catalysts (siccatives) are cobalt, lead, manganese, zirconium salts, particularly octoate and naphthenate. Catalysts of this type are described, for example in Ullmanns Encyklopadie der technischen Chemie [Ullmanns Encyclopedia of Industrial Chemistry]. 4th edition (1983), Volume 23, page 421 to 424.

The solvent aids, for example ethers such as dimethyl(diethyl) glycol, dimethyl(diethyl)diglycol, tetrahydrofuran, ketones such as methyl ethyl ketone, acetone, cyclohexanone, esters such as butyl acetate, ethylglycol acetate, methylglycol acetate, methoxypropyl acetate, alcohols such as ethanol, propanol and butanol are used, if at all, only in the lowest possible amount for reasons of environmental protection, which generally does not exceed 10, preferably 1 to 5% by weight, relative to the water (as the main diluent). The amount of water in the aqueous coating composition is in most cases 15 to 80% by weight, preferably 30 to 60% by weight, relative to the entire coating composition.

The aqueous coating composition is prepared by the conventional methods of paint manufacture such as evident from the guiding recipe shown below.

The aqueous coating composition which is infinitely dilutable with water and whose total solids content is in general 20 to 70, preferably 30 to 50% by weight, is applied in a known manner by spraying using the compressed-air method or by means of airless or electrostatic spraying processes. The applied layers are generally cured at room temperature, as a result of which they become dust-dry after only a short time, for example after about 30 minutes. If necessary, the curing can also be carried out at elevated temperatures of up to 120° C., preferably 50° to 80° C., The coating compositions of the invention have excellent pigment compatibility, and the coatings prepared therefrom have good corrosion protection and good mechanical properties, even in the absence of siccatives. They are therefore particularly suitable for primers, particularly for the protection of metallic substrates, but can also be used for other types of coatings.

In the following examples there are described several preferred embodiments to illustrate the invention. However, it should be understood that the invention is not intended to be limited to the specific embodiments.

I Preparation of the fatty acid modified diols (B)/general procedure

Diepoxide and unsaturated fatty acid were initially introduced in the molar ratio of 1:2 and heated to 120° C. under an N₂ atmosphere. Stirring at 110°–120° C. was continued until the acid number had fallen below 1 and the intrinsic viscosity number had risen to more than 40,000. The crude product can then be used without any further purification.

II Preparation of fatty acid modified monoalcohols (E)/general procedure

The monoepoxide and the unsaturated fatty acid were initially introduced in the molar ratio of 1:1 and heated to 120° C. under an $N_2$ atmosphere. Stirring at 110° to 120° C. was continued until the acid number had fallen below 1 and the intrinsic viscosity number had risen to more than 40,000. The product can then be further used as formed.

III Preparation of the binders

EXAMPLE 1

189.0 g of the reaction product of bisphenol A diglycidyl ether, intrinsic viscosity number 183 (®Beckopox EP 140) and linseed oil fatty acid prepared according to the above procedure I were heated to 100° C. together with 40.5 g of dimethylolpropionic acid and 80 g of N-methylpyrrolidone. After everything was dissolved, the mixture was allowed to cool to 70° C. and 95.7 g of toluylene diisocyanate (mixture of isomers) were then metered in at such a rate that the temperature did not exceed 75° C. After complete conversion of the diol components, 44.2 g of the reaction product from the glycidyl ester of Versatic Acid (®Cardura E 10) and linseed oil fatty acid prepared according to the above procedure II were added. After the reaction was complete, the resin was dispersed at 70° C. using a soluton of 161 g of $NH_3$ (25% strength) in 720 g of water.

EXAMPLE 2

199.2 g of the reaction product from Beckopox EP 140 and soya oil fatty acid were heated to 110° C. together with 40.2 g of dimethylolpropionic acid and 100 g of N-methylpyrrolidone. After everything was dissolved, the mixture was allowed to cool to 70° C., and 95.7 g of toluylene diisocyanate (mixture of isomers) was metered in at such a rate that the temperature did not exceed 75° C. After complete conversion of the diol components, 12.9 g of dibutylamine were added. After stirring for another 20 minutes, the resin was dispersed at 70° C. using a solution of 16.3 g of $NH_3$(25% strength) in 900 g of water.

EXAMPLE 3

A polyurethane resin was prepared as described above from 116.2 g of the reaction product from Beckopox EP 140 and linseed oil fatty acid, 35.1 g of dimethylolpropionic acid, 91.4 g of toluylene diisocyanate (mixture of isomers) and 128.7 g of the reaction product from Cardura E 10 and linseed oil fatty acid in 90 g of N-methylpyrrolidone. 90.4 g of a water-insoluble, short-oil, air-drying alkyd resin based on oil (triglyceride), phthalic anhydride and modified resins, which had an iodine color number (DIN 6162) of less than 25 and an acid number (DIN 53402) of less than 25, was then stirred into this resin at 90 to 100° C. After stirring at 80° C. for another 2 hours, the resin was dispersed using a solution of 17.8 g of $NH_3$ (25% strength) in 758 g of water.

IV Guiding recipe for paint preparation

An amount corresponding to 80 g of binder (solid) of the dispersions of the above examples was, in each case, dispersed in a pearl mill, together with 20 g of iron oxide, 23 g of zinc phosphate, 23 g of talc, 14 g of calcium carbonate, 0.6 g of antifoam, 1.5 g of antisettling agent and such an amount of deionized water that a 50% strength paint was formed. After applying the paint by spraying and air-drying for 14 days, the coated steel sheets were tested accordingly (see Table 1 below).

TABLE 1

| Example | | 1 | 2 | 3 |
|---|---|---|---|---|
| Store stability (4 week, 50° C.) | | OK | OK | OK |
| Time to dust-dry | | 55' | 35' | 35' |
| Pendel hardness according to | 24 h | 82" | 65" | 37" |
| König | 7 d | 100" | 100" | 88" |
| (DIN 53157) | 14 d | 120" | 120" | 100" |
| Salt spray test | $B_m{}^{1)}$ | 2.0 | 2.0 | 3.0 |
| (168; 40 µm dry film) | $B_g{}^{1)}$ | 1.0 | 1.0 | 1.0 |
| (DIN 50021) | $R^{2)}$ | 0.5 | 1.0 | 1.0 |
| Tropical weathering test | $B_m{}^{1)}$ | 0 | 0 | 0 |
| (500 h; 40 µm dry film) | $B_g{}^{1)}$ | 0 | 0 | 0 |
| (DIN 50017) | $R^{2)}$ | 0.5 | 0.5 | 0.5 |
| Crosshatch test | on Fe | 0.5 | 0.5 | 0.5 |
| (DIN 53151) | on Al | 0.5 | 3 | 0.5 |
| | on Zn | 2 | 5 | 3 |
| Erichsen indentation test | | 8.5 | 7.5 | 8.5 |

$B_m$ = amount of bubbles; $B_g$ = degree of bubble formation;
R = degree of rusting
$^{1)}$determined by DIN 53209
$^{2)}$determined by DIN 53210

Various modification of the compositions and process of the invention may be made without departing from the spirit or scope thereof and it is to be understood that the invention is intended to be limited only as defined in the appended claims.

What is claimed is:

1. A process for the preparation of an aqueous coating composition containing at least one water-dispersible polyurethane resin containing air-drying groups, the polyurethane having no residual NCO content and a degree of branching of up to 30% and optionally further binder resins and paint additives, which polyurethane resin contains structural units derived from (A) polyisocyanates, (B) polyols containing air-drying groups, made by reacting unsaturated fatty acids with polyepoxides, (C) optionally polyols which are free of air-drying groups, (D) compounds having at least two groups which are reactive with isocyanate groups and at least one group capable of anion formation, (E) optionally monoalcohols containing air-drying groups, (F) and optionally compounds which differ from (B), (C), (D) and (E) which act as chain terminators and which are selected from the group consisting of monofunctional compounds which react with NCO groups and compounds having active hydrogen of different reactivity towards NCO groups which are selected from the group consisting of compounds having a primary amino group and a secondary amino group, compounds having a hydroxyl and carboxyl group, compounds having a primary or secondary amino group and a hydroxyl group 1; wherein the functionality and amounts of the polyfunctional components (A) through (D) are chosen such that there is a degree of branching in the resulting polyurethane of up to 30%, and wherein the amount of component (B) is such that the content of unsaturated fatty acids within the polyurethane is between 25 and 50 percent by weight, and wherein the content of the isocyanate component (A) within the resulting polyurethane is from 10 to 40 percent by weight, the content of component (F) is from 0 to 10 percent by weight of the polyurethane resin, the content of component (B) within the resulting polyurethane resin is from 20 to 60 percent by weight; the content of structural units derived from component (D) within the polyurethane resin is from 2 to 20 per cent by weight; and the content of components (C) is from 0 to 10 percent by weight of the total mass of polyol components (B) through (D); and wherein the equivalent ratio of isocyanate groups to the total number of hydroxyl groups in the polyols (B) through (D) is 1.05 to 1.4 which process comprises first preparing a polyurethane prepolymer from the polyisocyanates of (A), the polyols of (B) and optionally the polyols of (C) and the compounds of (D), which prepolymer contains on average at least 1.7 isocyanate groups per molecule, then reacting the prepolymer with the compounds of (E) and/or (F) in a non-aqueous system, and optionally then neutralizing the completely reacted polyurethane resin and transferring it into the aqueous system, it being possible for the further binder resins, if used, and the conventional additives to be added before, during and after the preparation of the polyurethane resin.

2. A process for the preparation of a coating composition containing at least one water-dispersible polyurethane resin containing air-drying groups and optionally further binder resins and paint additives, which polyurethane resin contains structural units derived from (A) polyisocyanates, (B) polyols containing air-drying groups, made by reacting unsaturated fatty acids with polyepoxides, (C) optionally polyols which are free of air-drying groups, (D) compounds having at least two groups which are reactive with isocyanate groups and at least one group capable of anion formation, (E) optionally monoalcohols containing air-drying groups, (F) and optionally compounds which differ from (B), (C), (D) and (E) which act as chain terminators and which are selected from the group consisting of monofunctional compounds which react with NCO groups and compounds having active hydrogen of different reactivity towards NCO groups which are selected from the group consisting of compounds having a primary amino group and a secondary amino group, compounds having a hydroxyl and carboxyl group, compounds having a primary or secondary amino group and a hydroxyl group;

wherein the functionality and amounts of the polyfunctional components (A) through (D) are chosen such that there is a degree of branching in the resulting polyurethane of up to 30%, and wherein the amount of component (B) is such that the content of unsaturated fatty acids within the polyurethane is between 25 and 50 percent by weight, and wherein the content of the isocyanate component (A) within the resulting polyurethane is from 10 to 40 percent by weight, the content of component (F) is from 0 to 10 percent by weight of the polyurethane resin, the content of component (B) within the resulting polyurethane resin is from 20 to 60 percent by weight; the content of structural units derived from component (D) within the polyurethane resin is from 2 to 20 percent by weight; and the content of components (C) is from 0 to 10 percent by weight of the total mass of polyol components (B) through (D); and wherein the equivalent ratio of isocyanate groups to the total number of hydroxyl groups in the polyols (B) through (D) is 1.05 to 1.4 wherein compounds (A), (B), optionally (C) and (D), (E) and/or (F) are reacted jointly in a non-aqueous system, and the completely reacted polyurethane resin is then preferably neutralized and converted into the aqueous system, it being possible for the further binder resins, if used, and the conventional additives to be added before, during and after the preparation of the polyurethane resin.

3. The process of claim 1 wherein the amount of polyurethane resin in the aqueous coating composition is 5 to 40% by weight, relative to the entire coating composition.

4. The process of claim 1 wherein the polyurethane resin has an average molecular weight $M_n$ of 1,600 to 30,000.

5. The process of claim 1 wherein the acid number of the polyurethane resin is 10 to 80.

6. The process of claim 1 wherein the amount of structural units (A) is 10 to 40% by weight, of structural units (B) 20 to 60% by weight, of structural units (C) 0 to 20% by weight, of structural units (D) 2 to 20% by weight, of structural units (E) 0 to 50% by weight, and of structural units (F) 0 t 10% by weight, each relative to the polyurethane resin, the percentages given adding up to 100%.

7. The Process of claim 1 wherein structural unit (B) is derived from polyepoxides having epoxy equivalent weights of 190 to 2,000.

8. The process of claim 1 wherein the compounds of (D) are polyols containing at least one carboxyl group.

9. The process of claim 1 wherein (D) is an α, α-dimethylolalkanoic acid.

10. The process of claim 1 wherein the compounds of (F) are monoamines.

11. The process of claim 1 wherein the compounds of (F) are monoamines and additionally contain at least one OH group.

12. The process of claim 1 wherein the aqueous coating composition additionally contains at least one further binder resin in an amount of up to 60% by weight, relative to the polyurethane resin.

13. The process of claim 1 wherein the aqueous coating composition additionally contains at least one further binder resin in an amount of up to 60% by weight, relative to the polyurethane resin, which further binder resin is a water-insoluble, air drying resin.

14. The process of claim 1 wherein the aqueous coating composition additionally contains at least one further binder resin in an amount of up to 60% by weight, relative to the polyurethane resin, which further binder resin is an alkyd resin.

15. The process of claim 1 wherein the polyurethane resin contains structural units derived from (a) polyisocyanates (B) polylols containing air-drying groups of a reaction product of polyepoxides and unsaturated fatty acids, (C) optionally polylols which are free of air-drying groups, (D) compounds having at least two groups which are reactive with isocyante groups and at least one group capable of anion formation, (E) optionally with at least one member of the group consisting of monoalcohols containing air-drying groups which are a reaction product of monoepoxides and unsaturated fatty acids and compounds containing at least one group which is reactive with NCO groups and different from (B), (C) and (D).

16. A process for the preparation of an aqueous coating composition as claimed in claim 1, wherein the polyurethane contains structural units derived from (A) diisocyanates.

17. A process for the preparation of an aqueous composition as claimed in claim 1, wherein the polyurethane contains structural units derived from (B) diols containing air-drying groups.

18. A process for the preparation of an aqueous coating composition as claimed in claim 1, wherein the polyurethane contains structural units derived from (C) diols which are selected from the group consisting of ethylene glycol, diethylene glycol, 1,2 and 1,3-propane diol, 1,4-butane diol, 1,3-butylene glycol, cyclohexane diol, 1,4-cyclohexane dimethanol, 1,6-hexane diol, bisphenol A, hydrogenated bisphenol A, mixtures thereof, or from trimethylol propane.

19. A process for the preparation of an aqueous coating composition as claimed in claim 1, wherein the polyurethane contains structural units derived from (D) compounds having two groups which are reactive towards isocyanate groups and at least one group capable of anion formation.

20. A process for the preparation of an aqueous coating composition as claimed in claim 1, wherein the polyurethane has a number average molecular weight $M_n$ of 1600 to 30,000 g/mol, calculated from the stoichiometry of the starting materials, an acid number of 10 to 80, a hydroxyl number of 0 to 50, and a mass fraction of groups derived from unsaturated fatty acids in the polyurethane resin of from 25 to 50%.

* * * * *